(12) United States Patent
Yasutomi et al.

(10) Patent No.: US 11,819,899 B2
(45) Date of Patent: Nov. 21, 2023

(54) SHEARING METHOD, SHEARING DEVICE, AND SHEARING FACILITY

(71) Applicant: NIPPON STEEL CORPORATION, Tokyo (JP)

(72) Inventors: Takashi Yasutomi, Tokyo (JP); Shigeru Yonemura, Tokyo (JP); Tohru Yoshida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 880 days.

(21) Appl. No.: 16/498,364

(22) PCT Filed: Mar. 20, 2018

(86) PCT No.: PCT/JP2018/011209
§ 371 (c)(1),
(2) Date: Sep. 26, 2019

(87) PCT Pub. No.: WO2018/180820
PCT Pub. Date: Oct. 4, 2018

(65) Prior Publication Data
US 2020/0030868 A1  Jan. 30, 2020

(30) Foreign Application Priority Data

Mar. 27, 2017  (JP) ................. 2017-060982

(51) Int. Cl.
*B21D 28/34* (2006.01)
*B23D 15/04* (2006.01)
(Continued)

(52) U.S. Cl.
CPC ............. *B21D 28/34* (2013.01); *B23D 15/04* (2013.01); *B23D 35/005* (2013.01); *B26D 1/01* (2013.01);
(Continued)

(58) Field of Classification Search
CPC ........ B23D 15/00; B23D 15/02; B23D 15/04; B23D 15/06; B23D 15/08; B23D 35/00;
(Continued)

(56) References Cited

U.S. PATENT DOCUMENTS 3,183,756 A * 5/1965 Dehn ..................... B23D 15/14
83/624
2008/0098788 A1  5/2008 Taniguchi et al.
(Continued)

FOREIGN PATENT DOCUMENTS

JP  7-51919 A  2/1995
JP  9-314250 A  12/1997
(Continued)

OTHER PUBLICATIONS

International Search Report for PCT/JP2018/011209 (PCT/ISA/210) dated Jun. 19, 2018.
(Continued)

*Primary Examiner* — Evan H Macfarlane
(74) *Attorney, Agent, or Firm* — Birch, Stewart, Kolasch & Birch, LLP

(57) ABSTRACT

A shearing method of a plate-shaped workpiece for applying a shear force in a thickness direction of the plate-shaped workpiece includes: a step for starting applying the shear force on the workpiece with a clearance between action points in a surface direction orthogonal to the thickness direction of the workpiece; a step for applying the shear force after the start of applying the shear force until a fractured surface is created in the workpiece; and a step for increasing the clearance depending on a deformation of the workpiece in the thickness direction after starting applying the shear force until the fractured surface is created in the workpiece.

10 Claims, 17 Drawing Sheets

(51) Int. Cl.
*B23D 35/00* (2006.01)
*B26D 1/01* (2006.01)
*B26D 7/06* (2006.01)
*B26D 7/26* (2006.01)
*B26D 1/00* (2006.01)

(52) U.S. Cl.
CPC ............. *B26D 7/06* (2013.01); *B26D 7/2628* (2013.01); *B26D 2001/0066* (2013.01)

(58) Field of Classification Search
CPC .. B23D 35/001; B23D 35/002; B23D 35/005; B21D 28/00; B21D 28/002; B21D 28/14; B21D 28/16; B21D 28/18; B21D 28/34; B26D 1/01; B26D 1/08; B26D 1/085; B26D 1/09; B26D 1/095; B26D 7/26; B26D 7/2614; B26D 7/2628; B26D 2007/2607; B26D 2007/2685
See application file for complete search history.

(56) References Cited

U.S. PATENT DOCUMENTS

2008/0236427 A1* 10/2008 Annoura ................ B23D 19/06
　　　　　　　　　　　　　　　　　　　　　　　101/463.1
2017/0166988 A1* 6/2017 Branagan ............... C21D 8/005

FOREIGN PATENT DOCUMENTS

| JP | 10-113726 A | | 5/1998 |
| JP | H1110437 A | * | 1/1999 |
| JP | 2008-290085 A | | 12/2008 |
| JP | 2011-88152 A | | 5/2011 |
| JP | 2016-87642 A | | 5/2016 |

OTHER PUBLICATIONS

Written Opinion of the International Searching Authority for PCT/JP2018/011209 (PCT/ISA/237) dated Jun. 19, 2018.

* cited by examiner

EXAMPLE 6

COMPARATIVE 1

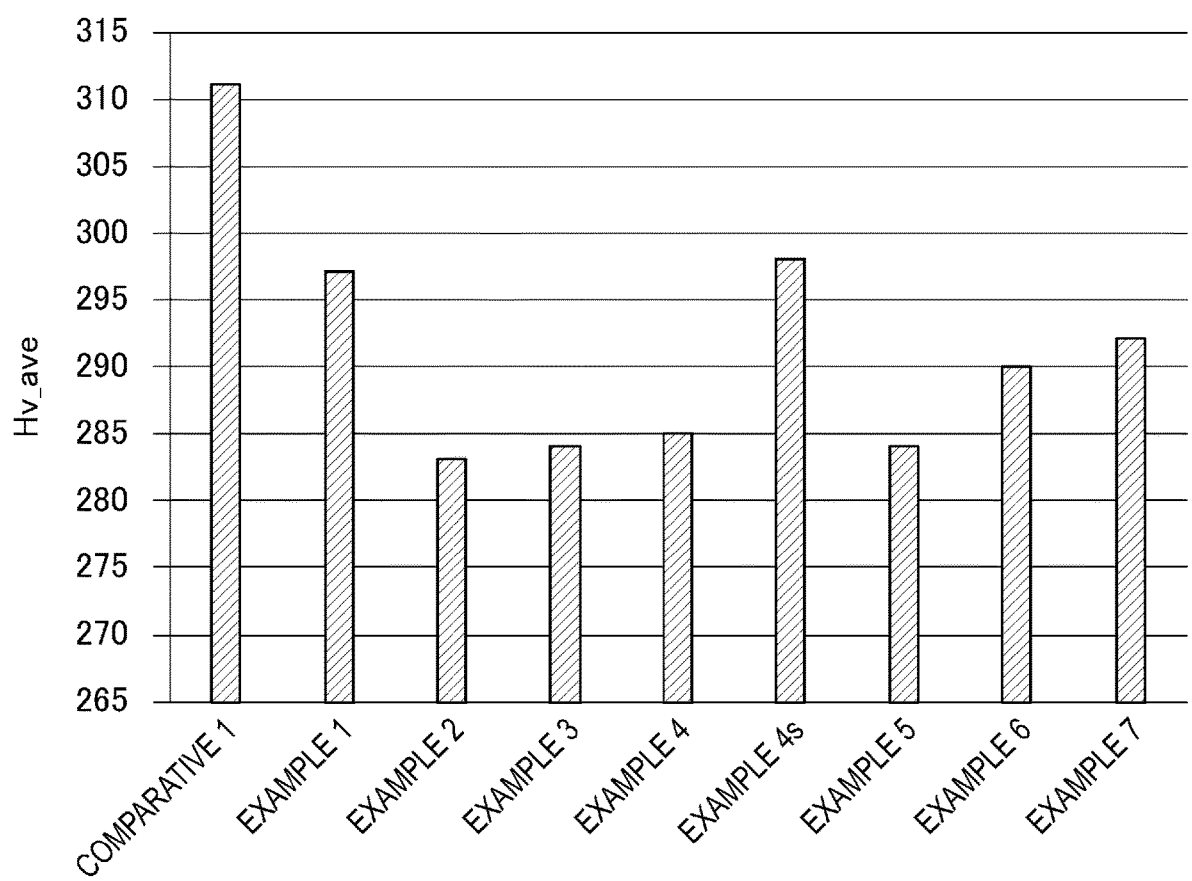

SHEARING METHOD, SHEARING DEVICE, AND SHEARING FACILITY

TECHNICAL FIELD

The present invention relates to a shearing method, a shearing machine, and shearing equipment.

BACKGROUND ART

Shearing is a process for manufacturing (e.g. cutting, blanking, punching, shaving, and trimming) metal components used for, for instance, automobiles, rail cars, building components, ships, and home electric appliances. The shearing is usually performed by pushing an upper blade toward a lower blade that is in contact with the component. At this time, the component is plastically deformed between the upper blade and the lower blade to be eventually cut. It is known that a part affected by work-hardening (work-hardened part) caused by the plastic deformation during the shearing remains on an end face of the component after being cut. When the component is, for instance, flanged in a subsequent step, the work-hardened part may sometimes be cracked.

Various proposals have thus been made in order to restrain the work-hardening on a component during the shearing process to provide a sheared surface excellent in stretch-flangeability. For instance, Patent Literature 1 discloses a technique for providing a sheared surface excellent in stretch-flangeability by appropriately setting a slant angle of a punching blade based on a numerical simulation. Patent Literature 2 discloses a technique for providing a sheared surface excellent in stretch-flangeability by gradually increasing a clearance with an increase in a distance from a dangerous region determined based on a simulation on stretch-flange cracks in subsequent step(s).

CITATION LIST

Patent Literature(s)

Patent Literature 1 JP 2011-88152 A
Patent Literature 2 JP 2016-87642 A

SUMMARY OF THE INVENTION

Problem(s) to be Solved by the Invention

However, the shearing, which inherently plastically deforms the components, inevitably entails work-hardening. Further, a fractured surface of the component, which extends along a plane connecting the upper blade and the lower blade, intersects a region in which the work-hardening is concentrated. Accordingly, even when the techniques disclosed in, for instance, the above Patent Literatures 1 and 2 are employed, the work-hardened parts still remain on the end face of the component after being cut, leaving a margin for improvement in the property of the components (e.g. stretch-flangeability).

In view of the above, an object of the invention is to provide a novel and improved shearing method, shearing machine, and shearing equipment capable of reducing influence of work-hardening on an end face of a component after being cut.

Means for Solving the Problem(s)

Some aspects of the invention provided herein are as follows.

[1] A shearing method for applying a shear force on a plate-shaped workpiece in a thickness direction to cut the workpiece, the method including:
  starting application of a shear force on the workpiece with a clearance between action points in a surface direction orthogonal to the thickness direction of the workpiece;
  applying the shear force after starting applying the shear force until a fractured surface is created on the workpiece; and
  increasing the clearance depending on a deformation of the workpiece in the thickness direction after starting applying the shear force until the fractured surface is created on the workpiece.

[2] The shearing method according to [1], where the method is performed using a plurality of shearing machines each including a lower blade and an upper blade movable in the thickness direction of the workpiece relative to the lower blade, a clearance defined between the lower blade and the upper blade along the surface direction of the workpiece being different in each of the plurality of shearing machines, and
  in increasing the clearance, the shear force is sequentially applied on the workpiece from one of the plurality of shearing machines whose clearance is small to one of the plurality of shearing machines whose clearance is large.

[3] The shearing method according to [1], where the method is performed using a single shearing machine including a lower blade configured to be in contact with a lower side of the workpiece and an upper blade movable in the thickness direction of the workpiece relative to the lower blade, and the method further includes:
  bringing the lower blade into contact with the lower side of the workpiece;
  moving the upper blade in the thickness direction until the upper blade is in contact with an upper side of the workpiece while retaining the clearance with respect to the lower blade in the surface direction of the workpiece;
  moving the upper blade in contact with the upper side of the workpiece further in the thickness direction of the workpiece until a fractured surface is created in the workpiece; and
  increasing the clearance depending on a relative movement distance of the upper blade and the lower blade in the thickness direction of the workpiece after the upper blade is in contact with the upper side of the workpiece until the fractured surface is created.

[4] The shearing method according to [3] where
  the lower blade is movable relative to the upper blade in the surface direction of the workpiece, and
  in increasing the clearance, the lower blade and the upper blade are relatively moved away from each other depending on the relative movement distance between the upper blade and the lower blade in the thickness direction of the workpiece.

[5] The shearing method according to [3] or [4], where, in increasing the clearance, the clearance is continuously increased depending on the relative movement distance between the upper blade and the lower blade in the thickness direction of the workpiece.

[6] The shearing method according to [3] or [4], where, in increasing the clearance, the clearance is increased in a stepwise manner depending on the relative movement distance between the upper blade and the lower blade in the thickness direction of the workpiece.

[7] The shearing method according to [3] or [4], where
in increasing the clearance, the clearance is increased at a single timing determined depending on the relative movement distance between the upper blade and the lower blade in the thickness direction of the workpiece.

[8] The shearing method according to any one [3] to [7], where
the increase in the clearance occurs when the relative movement distance of the upper blade and the lower blade is 20% or more of a reference movement distance, which corresponds to the relative movement distance of the upper blade and the lower blade in the thickness direction of the workpiece after the upper blade is in contact with the upper side of the workpiece until the fractured surface is created when the clearance is fixed at a predetermined value.

[9] The shearing method according to any one of [1] to [8], where the workpiece is a steel sheet having a tensile strength of 270 MPa or more.

[10] The shearing method according to any one of [1] to [9], where the workpiece is a steel sheet having a thickness ranging from 0.2 mm to 2 mm.

[11] A shearing machine including:
a lower blade;
an upper blade movable in an approaching/separating direction relative to the lower blade, the upper blade facing the lower blade with a clearance in a direction orthogonal to the approaching/separating direction; and
a clearance adjuster configured to increase the clearance depending on a movement distance of the upper blade in the approaching direction.

[12] The shearing machine according to [11], where
the lower blade is movable in the direction orthogonal to the approaching/separating direction relative to the upper blade, and
the clearance adjuster is configured to move the lower blade away from the upper blade depending on the relative movement distance of the upper blade and the lower blade in the approaching direction.

[13] The shearing machine according to [11] or [12], where the clearance adjuster is configured to continuously increase the clearance depending on the relative movement distance of the upper blade and the lower blade in the approaching direction.

[14] The shearing machine according to [13], where the clearance adjuster includes:
a first slant surface movable in a relative movement direction of the upper blade and the lower blade integrally with the upper blade; and
a second slant surface configured to be in slidable contact with the first slant surface and movable in a direction orthogonal to the relative movement direction of the upper blade and the lower blade integrally with the lower blade, and
the shearing machine further includes a clearance retainer configured to retain the clearance when the first slant surface is not in slidable contact with the second slant surface.

[15] The shearing machine according to [13], where the clearance adjuster includes an elastic member configured to apply an elastic force to the lower blade, the elastic force resisting a pushing force received by the lower blade in the direction orthogonal to the approaching direction of the upper blade in response to a movement of the upper blade in the approaching direction.

[16] The shearing machine according to [11] or [12], where the clearance adjuster is configured to increase the clearance in a stepwise manner depending on the relative movement distance of the upper blade and the lower blade in the approaching direction.

[17] The shearing machine according to [11] or [12], where the clearance adjuster is configured to increase the clearance at a single timing determined depending on the relative movement distance of the upper blade and the lower blade in the approaching direction.

[18] The shearing machine according to any one of [11] to [17], where the clearance adjuster is configured to increase the clearance when the relative movement distance of the upper blade and the lower blade reaches 20% or more of a reference movement distance, which corresponds to the relative movement distance of the upper blade and the lower blade from a start to an end of shearing.

[19] Shearing equipment including:
a transfer device configured to transfer a workpiece; and
a plurality of shearing machines disposed along a transfer path of the transfer device, the plurality of shearing machines being configured to share a shearing process on the workpiece, where
each of the plurality of shearing machines includes: a lower blade; and an upper blade movable in an approaching/separating direction relative to the lower blade, the upper blade facing the lower blade with a clearance in a direction orthogonal to the approaching/separating direction, and
the plurality of shearing machines are disposed in an ascending order of the clearance in each of the plurality of shearing machines from an upstream to a downstream of the transfer path.

According to the above aspects of the invention, the clearance is changed to be increased during a shearing process, so that the influence of work-hardening on an end face of a component after being cut can be reduced.

BRIEF DESCRIPTION OF DRAWING(S)

FIG. 11 is a graph showing an average Vicker's hardness of an end face of the workpiece after being cut in Examples and Comparative of the invention.

DESCRIPTION OF EMBODIMENT(S)

Figure 1:
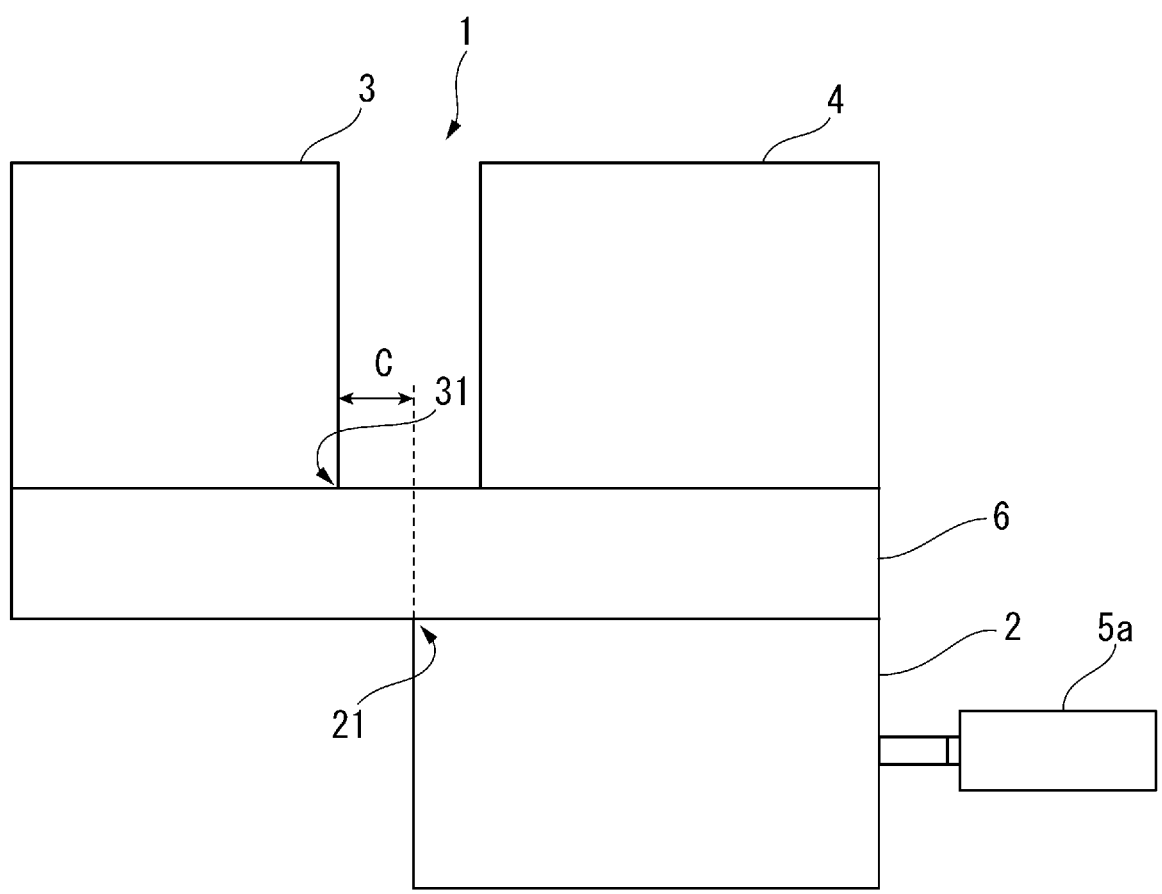
FIG. 1 is a schematic cross section showing a shearing machine according to an exemplary embodiment of the invention.

An exemplary embodiment of the invention will be described below in detail with reference to the attached drawings. It should be noted that the same reference numerals will be attached to components having substantially the same structures and functions to omit duplicated explanations therefor in the specification and drawings.

FIG. 1 is a schematic cross section showing a shearing machine 1 according to an exemplary embodiment of the invention. Referring to FIG. 1, the shearing machine 1 according to the exemplary embodiment includes a die 2, a punch 3, a holder 4, and an actuator 5a. The die 2 is provided with a lower blade 21 to be in contact with a lower side of a plate-shaped workpiece 6. The punch 3 is provided with an upper blade 31. The punch 3 is driven by a motor or a hydraulic device (not shown) to be capable of movement relative to the die 2 in a thickness direction (i.e. approaching/separating direction of the upper blade 31 and the lower blade 21) of the workpiece 6. In accordance with the movement of the punch 3, the upper blade 31, which is initially located above the workpiece 6, is brought into contact with an upper side of the workpiece 6 as illustrated, and pushed against the workpiece 6. In the process for the upper blade 31 to be pushed against the workpiece 6, a fractured surface is created between the lower blade 21 and the upper blade 31, so that the workpiece 6 is cut off at a portion against which the punch 3 is pushed. The holder 4 is configured to be brought into contact with the upper side of the workpiece 6 so that the workpiece 6 is held between the holder 4 and the die 2. The actuator 5a is, for instance, a motor or a hydraulic device. The actuator 5a is connected to the die 2 and configured to move the die 2 in a surface direction of the workpiece 6 (i.e. in a direction orthogonal to the thickness direction of the workpiece 6).

Though it is described in the above that the upper blade 31 moves relative to the lower blade 21 in the approaching/separating direction, the lower blade 21 may alternatively be configured to move relative to the fixed upper blade 31, or the upper blade 31 and the lower blade 21 may be configured to move relative to each other.

The upper blade 31 faces the lower blade 21 at a clearance C in the surface direction (a direction orthogonal to the approaching/separating direction of the upper blade 31) of the workpiece 6. The movement of the die 2 in the surface direction of the workpiece 6 caused by the actuator 5a displaces the lower blade 21 toward or away from the upper blade 31. The clearance C is reduced when the lower blade 21 moves toward the upper blade 31, and is enlarged when the lower blade 21 moves away from the upper blade 31. The actuator 5a increases the clearance C depending on the movement distance of the upper blade 31 after the upper blade 31 is in contact with the upper side of the workpiece 6 until the fractured surface is created in the workpiece 6. Specifically, the actuator 5a moves the lower blade 21 away from the upper blade 31 depending on the movement distance of the upper blade 31 in the thickness direction of the workpiece 6. The actuator 5a thus functions as the clearance adjuster in the exemplary embodiment. It should be noted that the actuator 5a may be configured to continuously move the lower blade 21 away from the upper blade 31 depending on the movement distance of the upper blade 31, or, alternatively, may be configured to move the lower blade 21 away from the upper blade 31 in a stepwise manner depending on the movement distance of the upper blade 31. Further, the actuator 5a may be configured to move the lower blade 21 away from the upper blade 31 by a predetermined distance at a single timing determined in accordance with the movement distance of the upper blade 31 in the thickness direction.

Figure 2A:
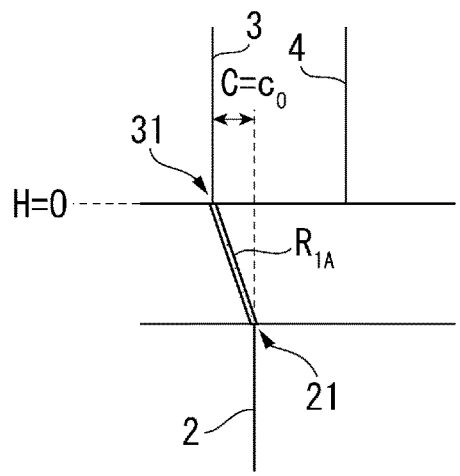
FIG. 2A is a schematic illustration showing an operation of the shearing machine shown in FIG. 1 and a behavior of a workpiece.
Figure 2B:
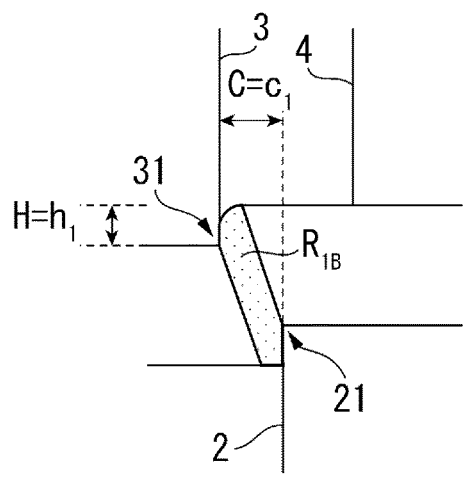
FIG. 2B is another schematic illustration showing the operation of the shearing machine shown in FIG. 1 and the behavior of the workpiece.
Figure 2C:
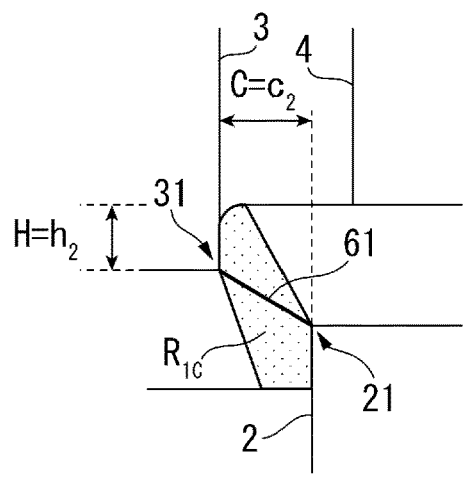
FIG. 2C is still another schematic illustration showing the operation of the shearing machine shown in FIG. 1 and the behavior of the workpiece.

FIGS. 2A to 2C are schematic illustrations showing the operation of the shearing machine 1 shown in FIG. 1 and the behavior of the workpiece 6.

FIG. 2A shows the upper blade 31 being in contact with the upper side of the workpiece 6. At this time, the clearance C is set at $c_0$. In the description below, a movement distance H (movement distance in the thickness direction of the workpiece 6) of the upper blade 31 at this time is defined as 0. When the upper blade 31 is further moved from the state shown in FIG. 2A to start being pushed against the workpiece 6, the plastic deformation of the material and work-hardening in accordance therewith start inside the workpiece 6. At this time, the work-hardened parts of the material concentrate in a region $R_{1A}$ along a plane connecting the lower blade 21 and the upper blade 31.

The state shown in FIG. 2A corresponds to a (shear start) step of starting applying a shear force on the workpiece 6 with a clearance between action points in the surface direction orthogonal to the thickness direction of the workpiece 6 in the exemplary embodiment.

FIG. 2B shows the upper blade 31 being further moved from the state shown in FIG. 2A to be pushed against the workpiece 6. At this time, the movement distance H of the upper blade 31 is defined as $h_1$. The actuator 5a moves the die 2 after the state shown in FIG. 2A, so that the lower blade 21 is moved away from the upper blade 31 with an increase in the clearance C (from $c_0$ to $c_1$). The work-hardening of the material inside the workpiece 6 occurs in a region $R_{1B}$. As compared with the region $R_{1A}$, the region $R_{1B}$ is enlarged at the lower side of the workpiece 6.

FIG. 2C shows the upper blade 31 being further moved from the state shown in FIG. 2B to be further deeply pushed against the workpiece 6. The movement distance H of the upper blade 31 is $h_2$, which is larger than $h_1$. At this time, a fractured surface 61 is created in the workpiece 6. The actuator 5a further moves the die 2 after the state shown in FIG. 2B, so that the lower blade 21 is moved further away from the upper blade 31 with an increase in the clearance C (from $c_1$ to $c_2$). The work-hardening of the material inside the workpiece 6 occurs in a region $R_{1C}$. As compared with the region $R_{1A}$, the region $R_{1C}$ is further enlarged at the lower side of the workpiece 6.

The states shown in FIGS. 2B and 2C correspond to steps subsequent to the shear start, which are a (shear end) step for applying the shear force until the fractured surface is created in the workpiece 6, and a step for increasing the clearance depending on a deformation of the workpiece 6 in the thickness direction until the fractured surface 61 is created in the workpiece 6 in the exemplary embodiment, respectively.

As shown in FIG. 2C, the fractured surface 61 of the workpiece 6 intersects the region $R_{1C}$ in which the work-hardening occurs. Accordingly, the region affected by the work-hardening remains in the end face of the workpiece 6 after being cut. However, as described below, due to the increase in the clearance C during the shearing depending on the movement distance H of the upper blade 31 in the exemplary embodiment, the work-hardening occurs in a dispersed manner and in a wider region than in a typical arrangement. Accordingly, the end face of the workpiece 6 after being cut is less affected by the work-hardening in the exemplary embodiment than in a typical shearing machine.

Figure 3A:
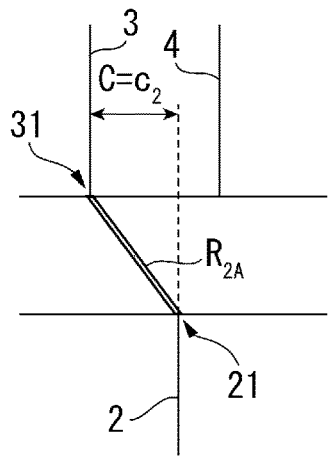
FIG. 3A is a schematic illustration comparable to FIG. 2A, showing an operation of a typical shearing machine and a behavior of a workpiece.
Figure 3B:
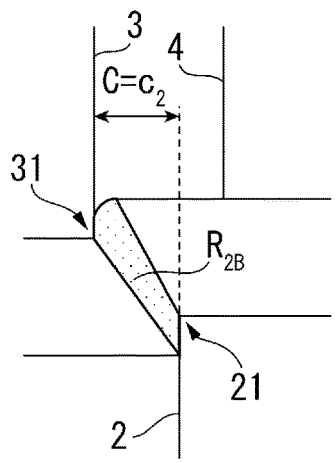
FIG. 3B is another schematic illustration comparable to FIG. 2B, showing the operation of the typical shearing machine and the behavior of the workpiece.
Figure 3C:
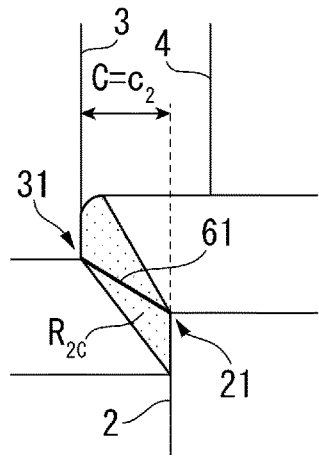
FIG. 3C is still another schematic illustration comparable to FIG. 2C, showing the operation of the typical shearing machine and the behavior of the workpiece.

FIGS. 3A to 3C are schematic illustrations comparable to FIG. 2A to 2C, showing an operation of a typical shearing machine and a behavior of the workpiece 6. In the illustrated typical shearing machine, the clearance C is fixed at $c_2$ (the same as the clearance C in FIG. 2C) throughout the shearing process.

In the state shown in FIG. 3A, the work-hardening of the material inside the workpiece 6 occurs in a region $R_{2A}$. As in the region $R_{1A}$ shown in FIG. 2A, the region $R_{2A}$ is a region along a plane connecting the lower blade 21 and the upper blade 31.

In the state shown in FIG. 3B, the work-hardening of the material inside the workpiece 6 occurs in a region $R_{2B}$. It should be noted that, though the region $R_{1B}$ shown in FIG. 2B is enlarged at the lower side of the workpiece 6, there is no such enlargement in the region $R_{2B}$ shown in FIG. 3B.

In the state shown in FIG. 3C, the work-hardening of the material inside the workpiece 6 occurs in a region $R_{2C}$. It should be noted that, though the region $R_{1C}$ shown in FIG. 2C is further enlarged at the lower side of the workpiece 6, there is no such enlargement in the region $R_{2C}$ shown in FIG. 3C. In other words, the region $R_{2C}$ is a relatively narrow region extending along the plane connecting the lower blade 21 and the upper blade 31.

There is no significant difference between the end profiles of the workpiece 6 after being cut in the exemplary embodiment shown in FIG. 2C and the typical shearing machine shown in FIG. 3C because of the same clearance C (c2) at the creation of the fractured surface 61 in the workpiece 6. The region affected by the work-hardening remains in the end face of the workpiece 6 after being cut in both of the shearing machines. However, the region $R_{1C}$ with the work-hardening being developed at the time of cutting in the exemplary embodiment is larger than the region $R_{2C}$ in the typical shearing machine. In other words, the work-hardening occurs in a wider region in a dispersed manner in the exemplary embodiment in a larger region than in a typical shearing machine. Accordingly, the end face of the workpiece 6 after being cut is less affected by the work-hardening in the exemplary embodiment than in a typical shearing machine.

Figure 4:
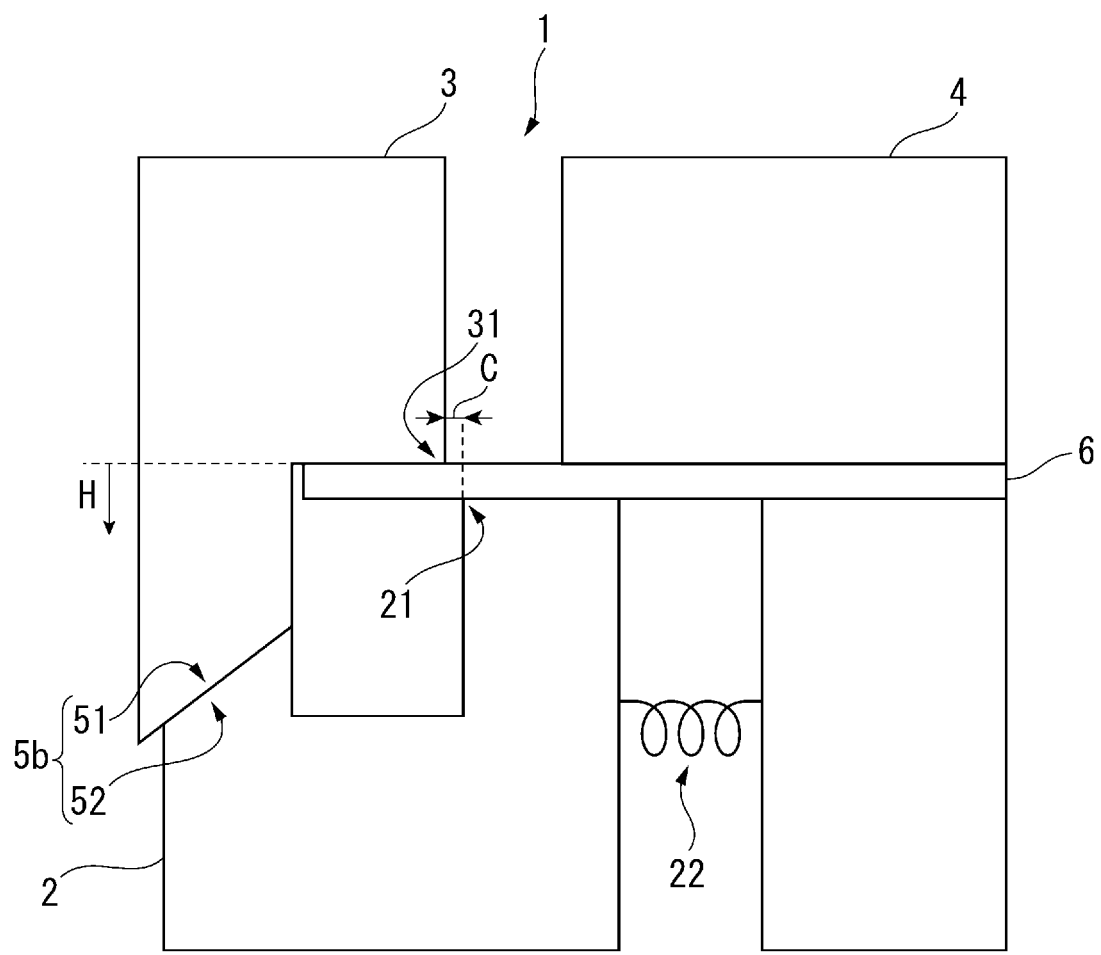
FIG. 4 is a schematic cross section showing another example of a clearance adjuster according to an exemplary embodiment of the invention.

FIG. 4 is a schematic cross section showing another example of a clearance adjuster according to an exemplary embodiment of the invention. Referring to FIG. 4, the shearing machine 1 in this example includes a clearance adjuster in a form of a linear cam mechanism 5b. The linear cam mechanism 5b includes a first slant surface 51 formed on the punch 3 and a second slant surface 52 formed on the die 2. The first slant surface 51 is movable in the thickness direction of the workpiece 6 integrally with the upper blade 31 formed on the punch 3. The second slant surface 52, which is configured to be in slidable contact with the first slant surface 51, is movable in the surface direction of the workpiece 6 integrally with the lower blade 21 formed on the die 2. The shearing machine 1 further includes a spring 22 configured to bias the die 2 toward the punch 3 in the surface direction of the workpiece 6. The spring 22 serves as a clearance retainer configured to keep the clearance C when the first slant surface 51 is not in slidable contact with the second slant surface 52.

In the above example, when the first slant surface 51 is brought into contact with the second slant surface 52 in accordance with the movement of the punch 3 in the thickness direction of the workpiece 6, the die 2 moves in the surface direction of the workpiece 6, so that the lower blade 21 starts moving away from the upper blade 31. Subsequently, while the first slant surface 51 and the second slant surface are in slidable contact with each other, the punch 3 continues movement in the thickness direction of the workpiece 6, in accordance with which the lower blade 21 continuously moves away from the upper blade 31. Thus, the linear cam mechanism 5b continuously moves the lower blade 21 away from the upper blade 31 depending on the movement distance of the upper blade 31 in the above example.

The use of the clearance adjuster in a form of the linear cam mechanism 5b, which can change the clearance C using a drive force of the punch 3, allows, for instance, simplification of the equipment and increase in the process speed. In contrast, the use of the clearance adjuster in a form of the above-described actuator 5a, which can change the clearance C independently of the drive of the punch 3, allows, for instance, adjustment of the change in the clearance C (e.g. change amount, change rate, start and end points of the change) as desired.

Figure 5A:
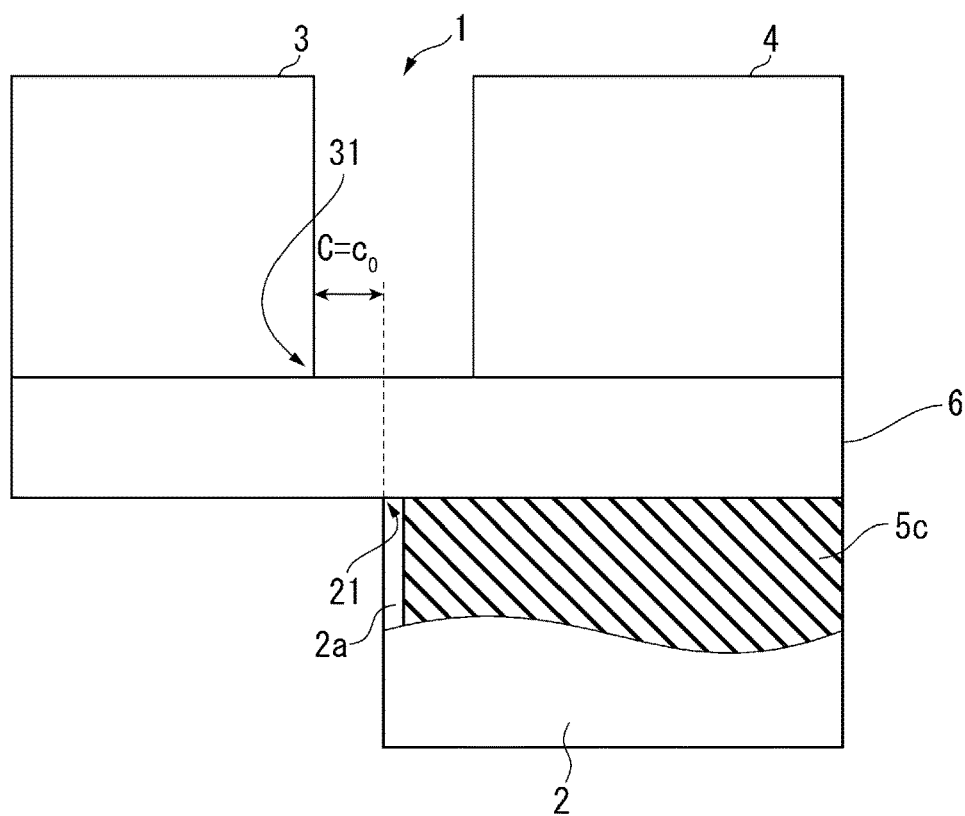
FIG. 5A is a schematic cross section showing still another example of the clearance adjuster according to an exemplary embodiment of the invention.
Figure 5B:
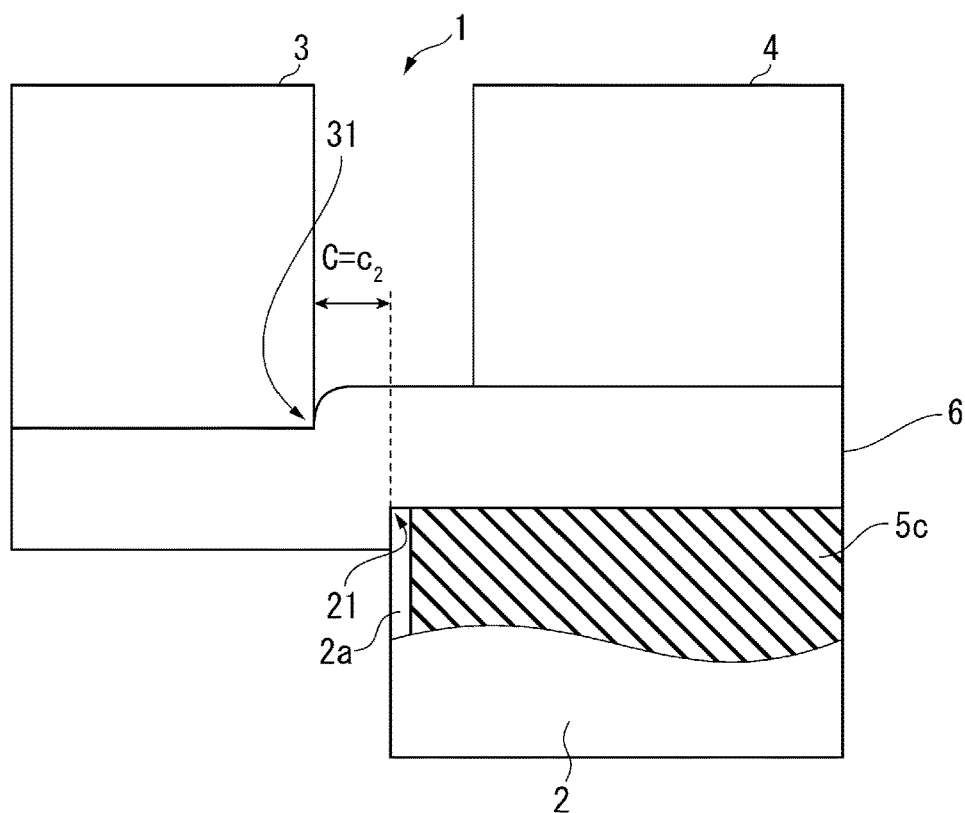
FIG. 5B is a schematic cross section showing the still another example of the clearance adjuster according to an exemplary embodiment of the invention.

FIGS. 5A and 5B are schematic cross sections showing still another example of the clearance adjuster according to an exemplary embodiment of the invention.

In the example explained with reference to FIG. 4, the clearance C is changed by forcibly moving the highly rigid die 2 provided with the lower blade 21 in a direction for changing the clearance by the linear cam mechanism 5b.

In contrast, as illustrated in FIG. 5A, the die 2 of the shearing machine 1 according to this example includes a die body 2a and an elastic body 5c, the lower blade 21 of the die body 2a with low rigidity being supported by the elastic body 5c to control a flexure of the lower blade 21 in a direction for changing the clearance ("clearance-changing direction").

The elastic body 5c supports the die body 2a in a manner allowing a movement of the die body 2a in the clearance-changing direction.

The die body 2a has a thin portion at an upper part (including the lower blade 21) whose thickness in the clearance-changing direction is smaller than other portions in the top-bottom direction.

The elastic body 5c at least supports the thin portion of the die body 2a when the punch 3 is in contact with the workpiece 6.

The die body 2a and the elastic body 5c are not necessarily bonded but may be separated when the shear force is not applied. The thickness of the thin portion may be different in the top-bottom direction.

It is only necessary for the elastic body 5c to be continuously extended in a direction for the lower blade 21 to be extended.

The dimensions in the top-bottom direction and in the clearance-changing direction of the elastic body 5c are determined based on, for instance, the location of the holder 4 and an elastic modulus of the elastic body 5c.

The elastic body 5c is attached to a wall (not shown) or the like at a side opposite the die body 2a. The upper part of the lower blade 21, which receives a pushing force on the workpiece 6 in the surface direction, is elastically deformed in the clearance-changing direction. The elastic body 5c applies an elastic force, which resists the pushing force received by the lower blade 21 in a direction orthogonal to the surface direction of the workpiece 6, to the die body 2a including the lower blade 21. Thus, in accordance with the gradual increase in the pushing force in the surface direction of the workpiece 6 applied on the lower blade 21, the elastically deformed upper part of the die body 2a gradually moves in the direction of the pushing force in the surface direction of the workpiece 6 while being supported by the elastically deformed elastic body 5c.

It should be noted that the die body 2a does not necessarily have the thin portion. In this case, an entirety of the die body 2a is attached in a manner movable along the surface direction of the workpiece 6 and the elastic body 5c supports the die 2 in a manner allowing the movement of the die 2. In accordance with the gradual increase in the pushing force in the surface direction of the workpiece 6 applied on the lower blade 21, the entirety of the die body 2a moves in the surface direction of the workpiece 6, so that the lower blade 21 gradually moves in the direction of the pushing force in the surface direction of the workpiece 6.

In the shearing machine 1, the pushing force in the surface direction of the workpiece 6 (specifically, the pushing force in a direction for the lower blade 21 to be away from the upper blade 31) is sometimes applied to the die 2 including the lower blade 21 in accordance with the movement of the punch 3 including the upper blade 31 in the thickness direction of the workpiece 6 after the punch 3 contacts the upper side of the workpiece 6. The pushing force gradually increases in accordance with the movement of the upper blade 31. In this case, the above-described elastic force applied by the elastic body 5c to the die body 2a for resisting the pushing force allows the clearance C to be continuously increased depending on the movement distance of the upper blade 31.

It should be noted that, in this example, an initial thickness of the elastic body 5c (i.e. a thickness without the workpiece 6 placed thereon or a thickness when the upper blade 31 is not in contact with the workpiece 6) and the properties of the elastic body 5c are determined based on an initial value $c_0$ of the clearance C. Further, the properties (e.g. elastic modulus (Young's modulus)) of the elastic body 5c are determined in accordance with an appropriate increase rate of the clearance C to the movement distance H of the upper blade 31.

A mechanical elastic member using a coil spring or an air cushion may be used in place of the elastic body 5c. For instance, the mechanical elastic member may include a support provided on a back side of the lower blade 21 and configured to support the lower blade 21, and a cam mechanism and/or a link mechanism driven in conjunction with the movement of the support, where the cam mechanism and/or the link mechanism is configured to, when being driven by a predetermined amount, apply a compression force on the coil spring or the air cushion to apply the elastic force resisting the pushing force of the lower blade 21 to the die body 2a.

Figure 6:
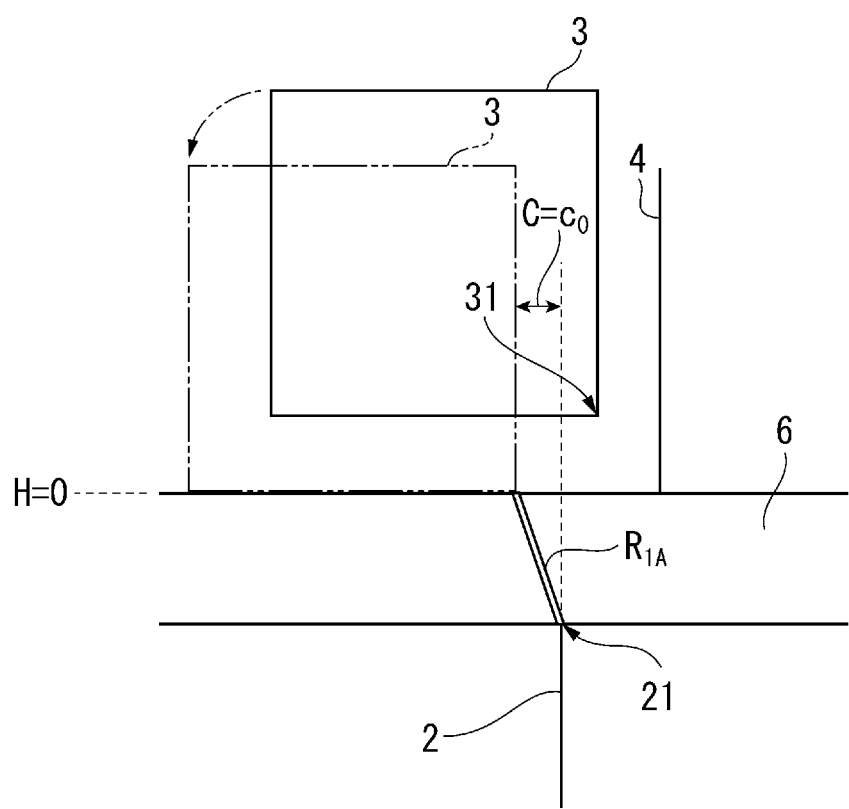
FIG. 6 is a schematic cross section showing a further example of the clearance adjuster according to an exemplary embodiment of the invention.

FIG. 6 is a schematic cross section showing a further example of the clearance adjuster according to an exemplary embodiment of the invention. Referring to FIG. 6, the punch 3 in this example stands by at a position shown in solid lines in FIG. 6. When the punch 3 is at the position represented by the solid lines in FIG. 6, the upper blade 31 of the punch 3 overlaps the region of the die 2 as viewed in a normal direction of the workpiece 6.

The punch 3 is configured to retract with respect to the die 2 at any one of timings of: prior to a start of descending; simultaneously with descending; or after a start of descending, to be positioned as shown in chain double-dashed lines in FIG. 6 when the punch 3 reaches the surface of the workpiece 6. At the position represented by the chain double-dashed lines in FIG. 6, the punch 3 is in contact with the upper side of the workpiece 6 at the clearance $C=c_0$.

In other words, it is only necessary for the punch 3, which may be at any standby position, to move from the standby position to a position capable of retaining the clearance $C=c_0$ between the punch 3 and the die 2 before or simultaneously with the timing for the punch 3 to reach the surface of the workpiece 6.

It should be noted that, though the punch 3 is illustrated to be moved relative to the die 2 in FIG. 6, the die 2 and the punch 3 may be moved in any manner as long as there occurs a relative movement between the die 2 and the punch 3. For instance, the die 2 may be moved relative to the punch 3, or both of the die 2 and the punch 3 may be moved.

Figure 7:
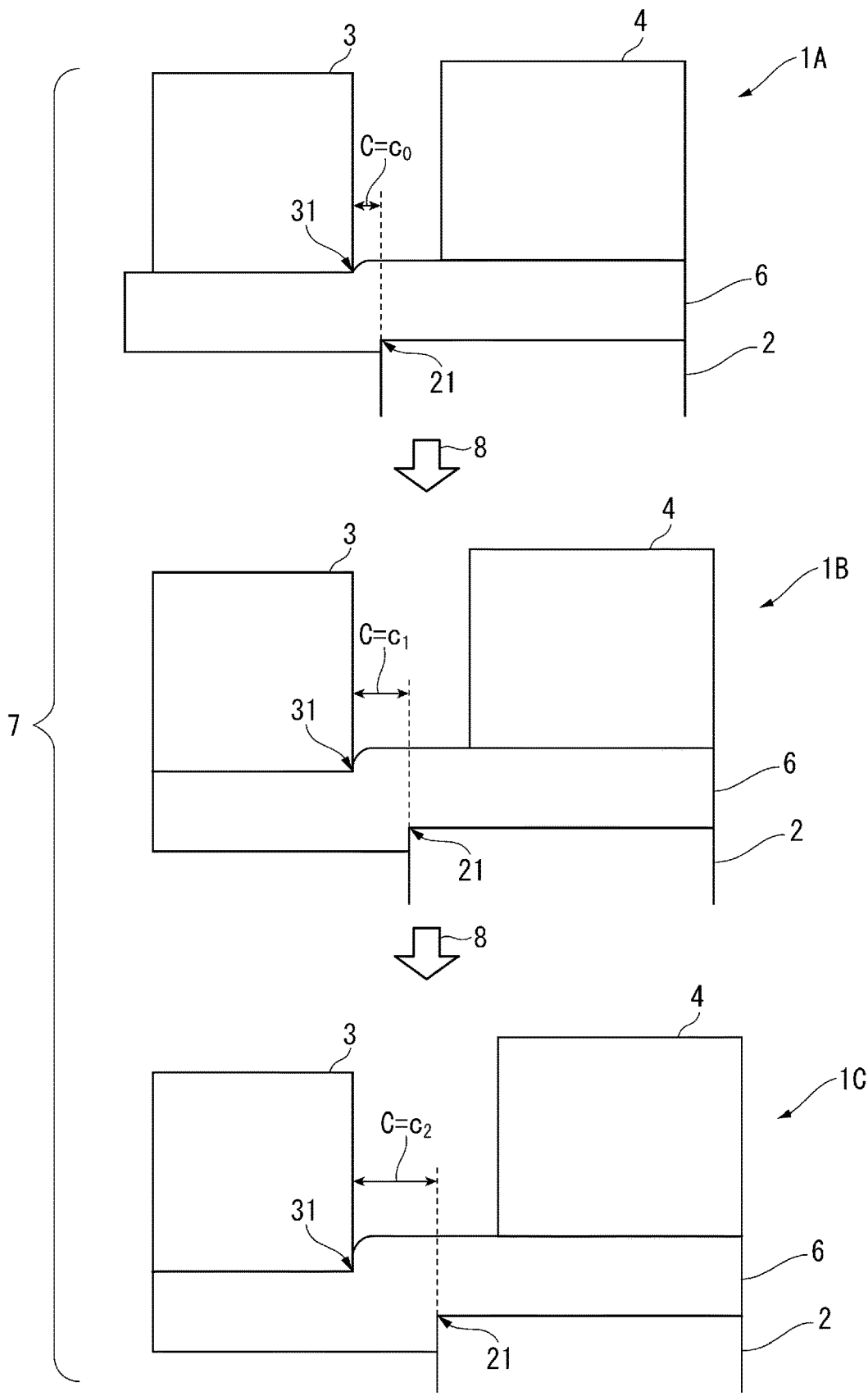
FIG. 7 is a schematic cross section showing another example for adjusting a clearance according to an exemplary embodiment of the invention.

FIG. 7 is a schematic cross section showing a further example of the clearance adjustment according to an exemplary embodiment of the invention. Referring to FIG. 7, shearing equipment 7 in this example includes a transfer device 8 and shearing machines 1A to 1C, which are arranged along the transfer device 8 and configured to share the shearing process of the workpiece 6. It should be noted that each of the shearing machines 1A, 1B, and 1C does not have the clearance adjuster in this exemplary embodiment.

The transfer device 8, which includes a robot arm, a belt conveyor and the like, is configured to transfer the workpiece 6 from an upstream to a downstream (i.e. from the shearing machine 1A to the shearing machine 1C in this order).

The clearance C in the shearing machine 1A is set at $c_0$ (C=$c_0$). The clearance C in the shearing machine 1B is set at $c_1$ (C=$c_1$), which is larger than the clearance in the shearing machine 1A. The clearance C in the shearing machine 1C is set at $c_2$ (C=$c_2$), which is larger than the clearance in the shearing machine 1B.

The shearing machine 1A applies a pushing force on the workpiece 6 with the clearance C=$c_0$ and a pushing amount H (i.e. the movement distance of the upper blade 31 and/or the lower blade 21 in the thickness direction of the workpiece 6)=0. When a work-hardened region $R_{1A}$ as shown in FIG. 2A is developed in this state, the workpiece 6 is transferred to the shearing machine 1B using the transfer device 8, the shearing machine 1B shearing the workpiece 6 with the clearance C=$c_1$ and pushing amount H=$h_1$ as shown in FIG. 2B. Finally, the workpiece 6 is transferred to the shearing machine 1C using the transfer device 8, the shearing machine 1C shearing the workpiece 6 with the clearance C=$c_2$ and pushing amount H=$h_2$ as shown in FIG. 2C. In other words, the plurality of shearing machines 1A, 1B, 1C in this example are arranged in an ascending order of the clearances from the upstream to the downstream of the transfer path.

Though the shearing equipment in the above example includes the three shearing machines 1A, 1B, 1C, the shearing equipment may alternatively include two shearing machines or four or more shearing machines. When there are three or more shearing machines, other part(s) of the workpiece 6 may be sheared while the clearance C of the shearing machine 1A is kept at C=$c_0$, the clearance C of the shearing machine 1B is kept at C=$c_1$, and the clearance C of the shearing machine 1C is kept at C=$c_0$.

With the use of the above-described plurality of shearing machines 1A to 1C, the step for starting applying the shear force on the workpiece 6 with a clearance between the action points in the surface direction orthogonal to the thickness direction of the workpiece 6, the step for applying the shear force after the start of applying the shear force until the fractured surface 61 is created in the workpiece 6, and the step for increasing the clearance depending on a deformation of the workpiece 6 in the thickness direction until the fractured surface 61 is created in the workpiece 6 can be performed. Accordingly, the same effect(s) and advantage(s) as described above can be obtained.

It should be noted that the clearance adjuster according to an exemplary embodiment of the invention is not limited to the above examples. For instance, the clearance adjuster may be multiple dies 2 exchangeable during the shearing process. In this case, the multiple dies 2, which correspond to different clearances C, are sequentially exchanged depending on the movement distance H of the upper blade 31 to change the clearance C in a stepwise manner. Alternatively, two types of the dies 2 each corresponding to an initial value of the clearance C (the clearance $c_0$ shown in FIG. 2A) and an end value (the clearance $c_2$ shown in FIG. 2C) may be prepared, which may be exchanged at one timing determined depending on the movement distance H of the upper blade 31 to increase the clearance C.

The exemplary embodiment(s) of the invention has been described above. It should be noted that the structure of the shearing machine shown in the cross section of FIG. 1 is not necessarily common to all of the shearing machines. Specifically, the shearing machine according to the exemplary embodiment may be provided with the above-described clearance adjuster (e.g. the actuator 5a, the linear cam mechanism 5b) only at a part of a shearing portion and the other part of the shearing portion may be provided with no clearance adjuster (and, consequently, with fixed clearance). More specifically, the clearance adjuster may be provided, for instance, only at a curved portion at which the stretch-flange cracks are likely.

EXAMPLE(S)

Next, Examples of the invention will be described below. It should be noted that the workpiece was a steel sheet with a tensile strength of 615 MPa and a plate thickness of 1 mm in all of Examples described below. The shearing process was punching using a 10-mm-diameter punch. Twelve dies with varying hole inner diameter from 10.1 mm to 10.4 mm in 0.025 mm increments were prepared and sequentially exchanged for shearing in accordance with the procedures explained below with reference to FIGS. 8 and 9.

Figure 8:
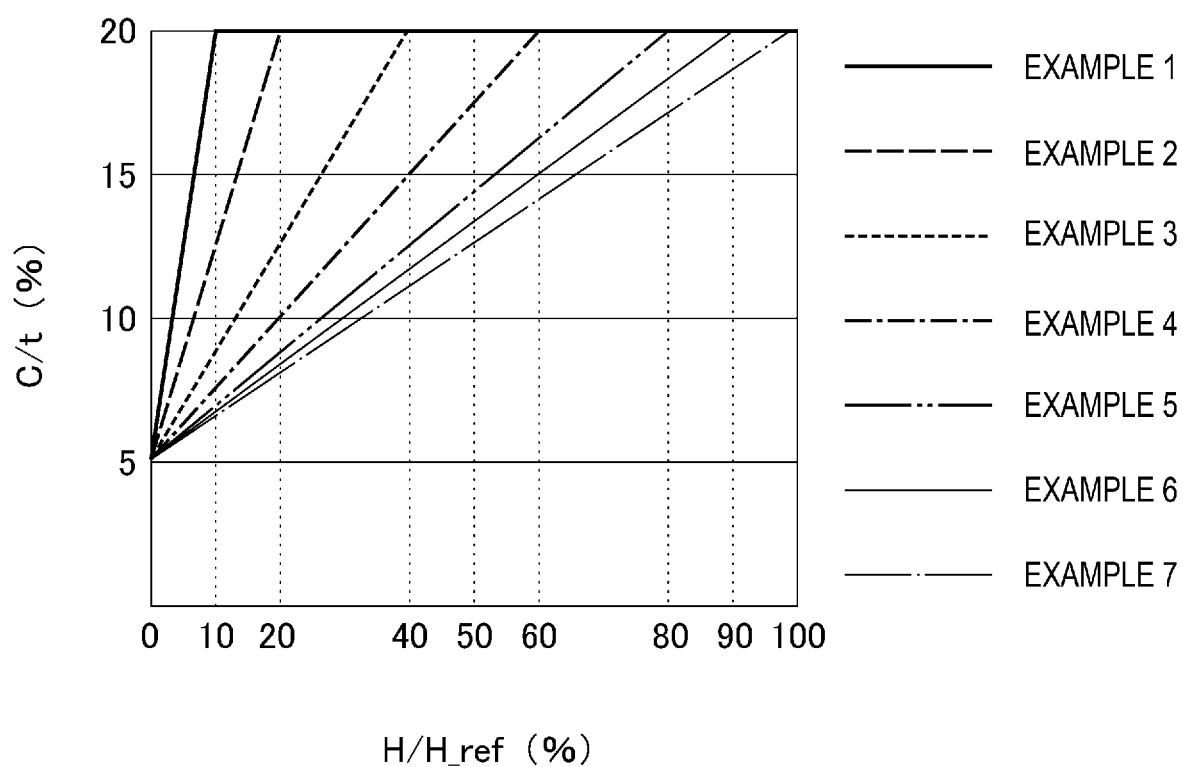
FIG. 8 is a graph for explaining Examples of the invention in which the clearance is continuously increased.

FIG. 8 is a graph for explaining Examples of the invention in which the clearance is continuously increased. The graph in FIG. 8 shows a relationship between the clearance C and the movement distance H of the upper blade in Examples 1 to 7. It should be noted that the clearance C is described with reference to a ratio to the plate thickness t (C/t) in the description of Examples below. In Examples, the increase in the clearance C from 0.05 mm to 0.2 mm in 0.0125 mm increments by exchanging the dies results in the increase in C/t from 5% to 20% in 1.25% increments. It should also be noted that the movement distance H is described with reference to a ratio to a reference movement distance $H_{\_ref}$ (H/$H_{\_ref}$) in the description of Examples below. The reference movement distance $H_{\_ref}$ herein refers to the movement distance H at which the fractured surface is created when the same workpiece as used in Examples is sheared with the clearance being fixed at a maximum value (C/t=20%). The reference movement distance $H_{\_ref}$, which is measured in a test conducted in advance, is used as an index common to Examples for controlling the clearance C.

In the illustrated Examples, the twelve dies were sequentially exchanged while the H/$H_{\_ref}$ varied from 0 to a predetermined value (10% in Example 1, 20% in Example 2, 40% in Example 3, 60% in Example 4, 80% in Example 5, 90% in Example 6, 100% in Example 7), thereby quasi-continuously increasing the C/t from 5% to 20%. After H/$H_{\_ref}$ reached the predetermined value, the movement of the upper blade was continued with C/t being kept at 20% until the fractured surface was created on the workpiece.

Figure 9:
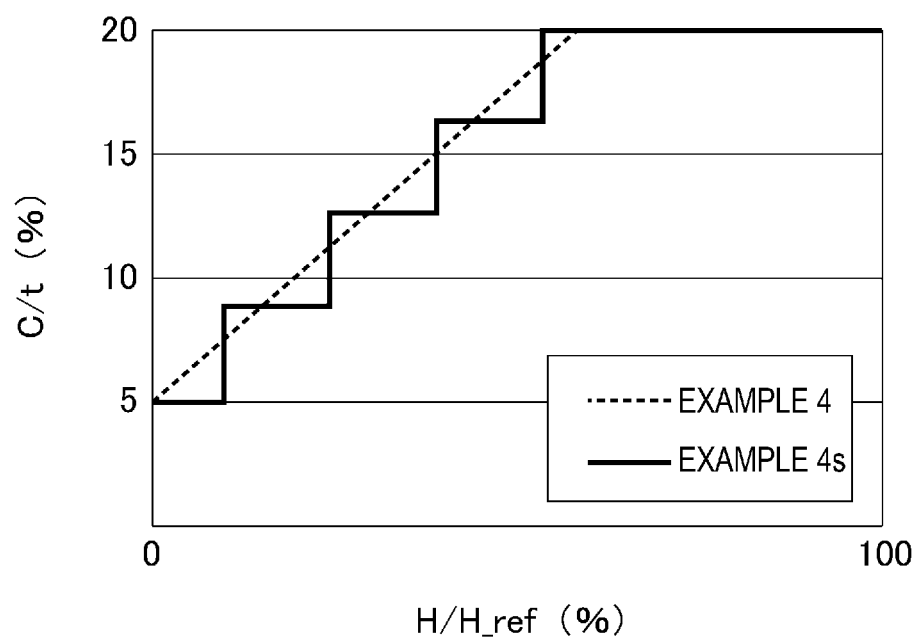
FIG. 9 is a graph for explaining Examples of the invention in which the clearance is increased in a stepwise manner.

FIG. 9 is a graph for explaining Examples of the invention in which the clearance is increased in a stepwise manner. The graph in FIG. 9 shows a relationship between the clearance C (C/t) and the movement distance H (H/$H_{\_ref}$) of the upper blade in each of Examples 4 and 4s. It should be noted that the graph of Example 4 is the same as that shown in FIG. 8. In Example 4s, the dies were sequentially exchanged in the substantially same range of the movement distance H as in Example 4 to increase C/t from 5% to 20%. However, Example 4s used only four of the twelve dies to change the clearance C in 0.0375 mm increments (i.e. in 3.75% increments of C/t) in a stepwise manner.

Figure 10A:
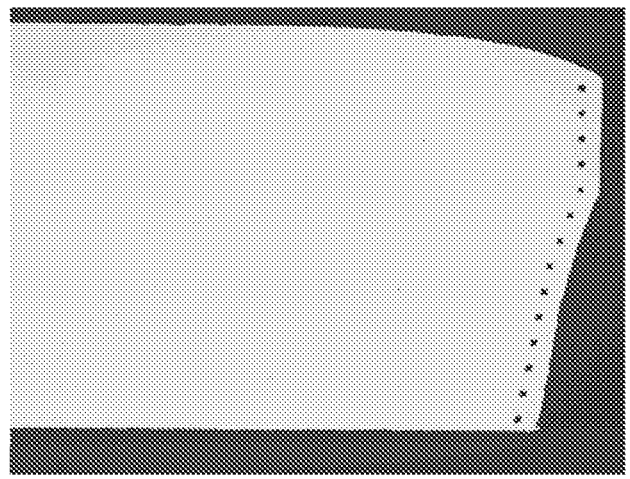
FIG. 10A is a photograph showing an end profile of a workpiece after being cut in an Example of the invention.
Figure 10B:
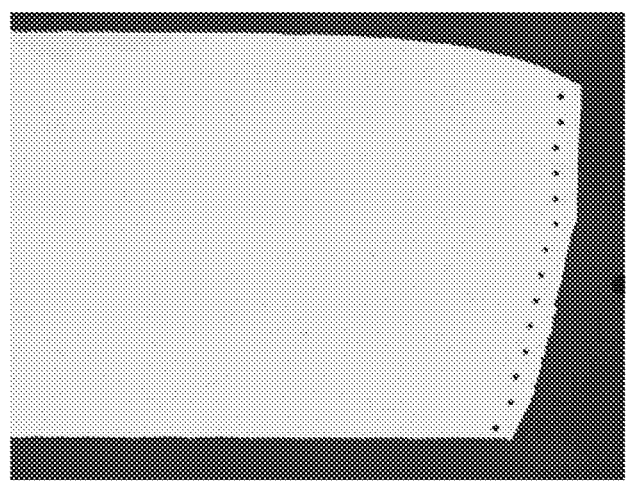
FIG. 10B is a photograph showing an end profile of a workpiece after being cut in a Comparative.

FIGS. 10A and 10B are photographs showing end profiles of the workpiece after being cut in Example and Comparative of the invention, respectively. FIG. 10A shows the end profile of the workpiece after being cut in Example 6 shown in FIG. 8 above. FIG. 10B shows an end profile of the workpiece after being cut in Comparative (Comparative 1), in which the same workpiece as in Examples was sheared with the clearance fixed at the maximum value (C/t=20%). As shown in these photographs, there is no significant difference between the end profiles of the workpiece after being cut in Example 6 and that in Comparative 1. There is also no significant difference between end profiles of the workpiece after being cut in Examples 2 to 5 and 7 and that in Comparative 1. Example 1 only shows slight change in the end profile as compared with Comparative 1, which will be described later.

FIG. 11 is a graph showing an average Vicker's hardness of an end face of the workpiece after being cut in Examples and Comparative of the invention. The hardness in each of Examples and Comparative was measured by: cutting the cut workpiece in a direction intersecting the end face; and conducting Vicker's hardness test (JIS Z 2244) at 14 points arranged in the thickness direction of the workpiece and remote from the end face by 80 microns. It should be noted that the points near the end face of the workpiece observed in FIGS. 10A and 10B are the measured points in the Vicker's hardness test. The graph in FIG. 11 shows an average ($Hv_{\_ave}$) of values at all the measured points of the measurements in the Vicker's hardness test in each of Examples and Comparative.

As shown in the graph, it can be understood that the values $Hv_{\_ave}$ in all of Examples 1 to 7 and 4s are lower than that in Comparative 1, showing the reduction in influence of work-hardening at the end face of the workpiece after being cut in each of Examples. Meanwhile, when comparing Examples, the value of $Hv_{\_ave}$ becomes especially small when the clearance C continuously increases and the increase in the clearance C occurs when the movement distance H is in a range from 20% to 80% of $H_{\_ref}$ (Examples 2 to 5). It is believed that the hardness in Example 1 is slightly greater than other Examples because there is a little difference in the end profile between Example 1, and Comparative 1 and other Examples, as described above.

Figure 12:
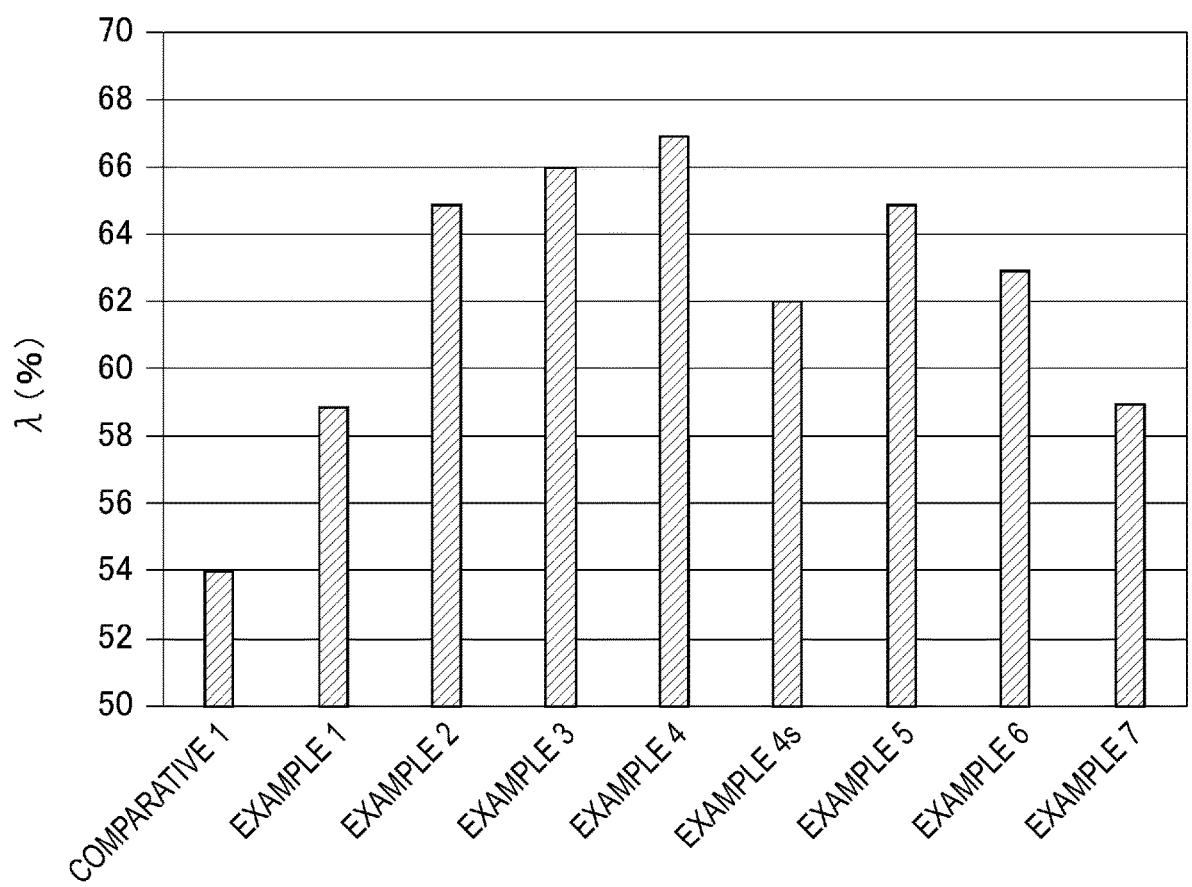
FIG. 12 is a graph showing hole expandability of the workpiece after being cut in Examples and Comparative of the invention.

FIG. 12 is a graph showing hole expandability of the workpiece after being cut in Examples and Comparative of the invention. In Examples and Comparative, the hole expandability was measured in a hole-expansion test (JIS Z 2256) conducted on the workpiece punched using a 10-mm-diameter punch as described above. The graph in FIG. 12 shows the hole expandability (λ) measured in the hole-expansion test in each of Examples and Comparative.

As shown in the graph, it can be understood that the values λ in all of Examples 1 to 7 and 4s are larger than in Comparative 1, showing the improvement in the hole expandability of the workpiece after being cut in each of Examples. Meanwhile, when comparing Examples, the value of λ becomes especially large when the clearance C continuously increases and the increase in the clearance C occurs when the movement distance H is in a range from 20% to 80% of $H_{\_ref}$ (Examples 2 to 5). It is believed that the hole expandability in Example 1 is slightly lower than other Examples because there is a little difference in the end profile between Example 1, and Comparative 1 and other Examples, as described above.

Figure 13:
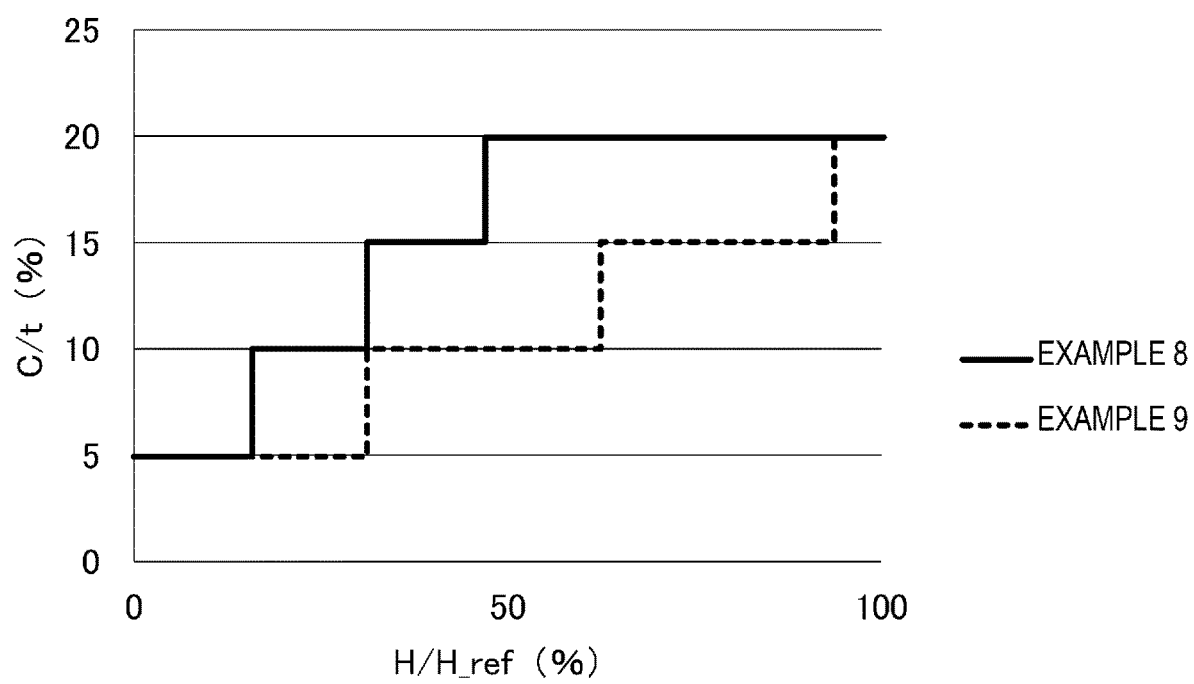
FIG. 13 is a graph for explaining other Examples of the invention in which the clearance is increased in a stepwise manner.

FIG. 13 is a graph for explaining other Examples of the invention in which the clearance is increased in a stepwise manner. The graph in FIG. 13 shows a relationship between the clearance C (C/t) and the movement distance H ($H/H_{ref}$) of the upper blade in Examples 8 and 9. The clearance C was increased in a stepwise manner in Example 8, where the dies were exchanged so that C/t increased from the initial value of 5% in increments of 3.75% when $H/H_{ref}$ was 16%, 32%, and 48%. Thus, C/t increases in four stages from the initial value of 5% to the maximum value of 20%. The clearance C was increased in a stepwise manner in Example 9 as in Example 8, where the dies were exchanged when $H/H_{ref}$ was 32%, 64%, and 96%, thereby more gently increasing C/t.

Figure 14:
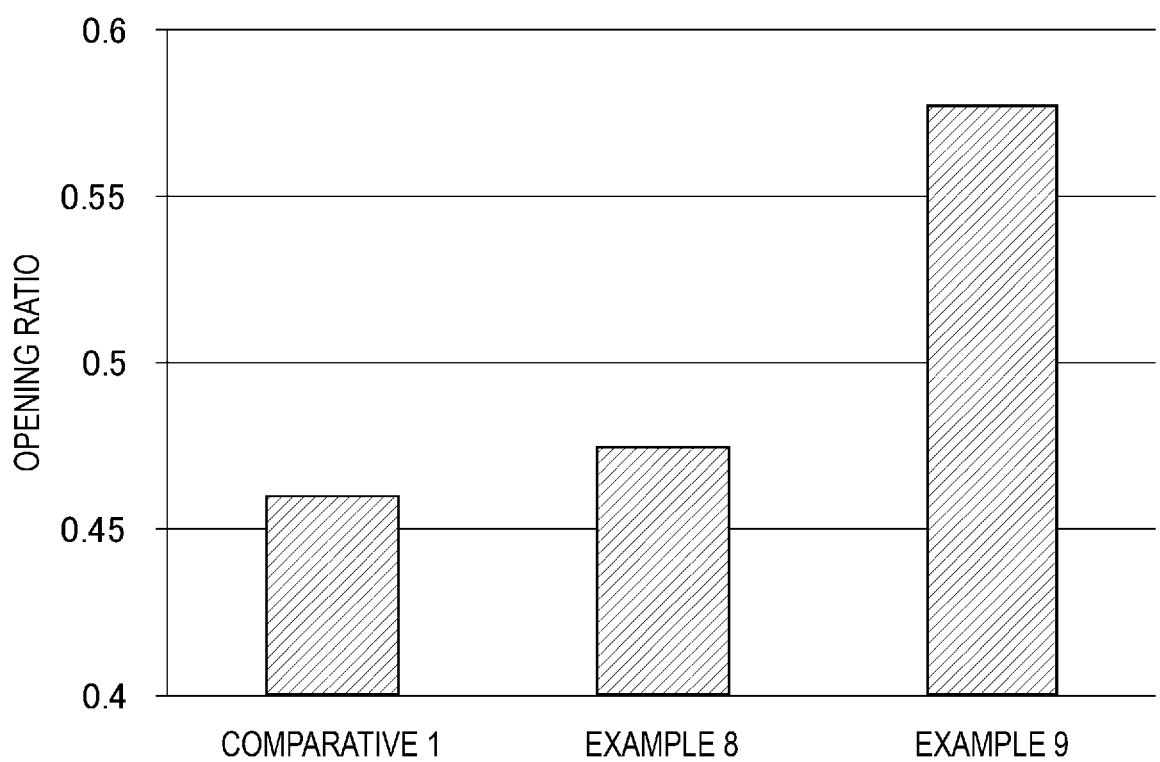
FIG. 14 is a graph showing an opening ratio measured in a side bend test in Examples and Comparative shown in FIG. 13.

FIG. 14 is a graph showing an opening ratio measured in a side bend test in Examples and Comparative shown in FIG. 13. The side bend test is described in detail in "Evaluation and Improving Method of Stretch Flange-ability," Yoshida et al, Shinnittetsu giho, NIPPON STEEL CORPORATION, 2012, No. 393, p.18-24. FIG. 12 shows opening ratios measured in the side bend test in Examples 8 and 9 shown in FIG. 11, and Comparative 1, in which the workpiece was sheared with the clearance fixed at the maximum value (C/t=20%). As shown in the graph, it can be understood that the opening ratios in both of Examples 8 to 9 are larger than that in Comparative 1, showing the improvement in the stretch-flangeability in each of Examples. Meanwhile, comparison between Examples 8 and 9 shows that the opening ratio is larger in Example 9, in which C/t was more gently increased.

Among the above-described Examples 1 to 7, though Examples 6 and 7, in which the clearance C was increased in the movement distance H range exceeding 80% of $H_{\_ref}$, showed improvement in the measurements in the Vicker's hardness test and hole expandability, the improvement was slightly less than in Examples 2 to 5. In contrast, comparison between Examples 8 and 9 shows that Example 9, in which the increase in the clearance C was stopped at $H/H_{\_ref}$=96%, exhibited larger improvement in the opening ratio than in Example 8, in which the increase in the clearance C was stopped at $H/H_{\_ref}$=48%. The above results show that, depending on the properties desired for the workpiece after shearing, the step of increasing the clearance C is not necessarily performed in the range of the movement distance H equal to or less than 80% of $H_{\_ref}$, but the step of increasing the clearance C sometimes should be performed in the range the movement distance H exceeding 80% of $H_{\_ref}$.

Figure 15:
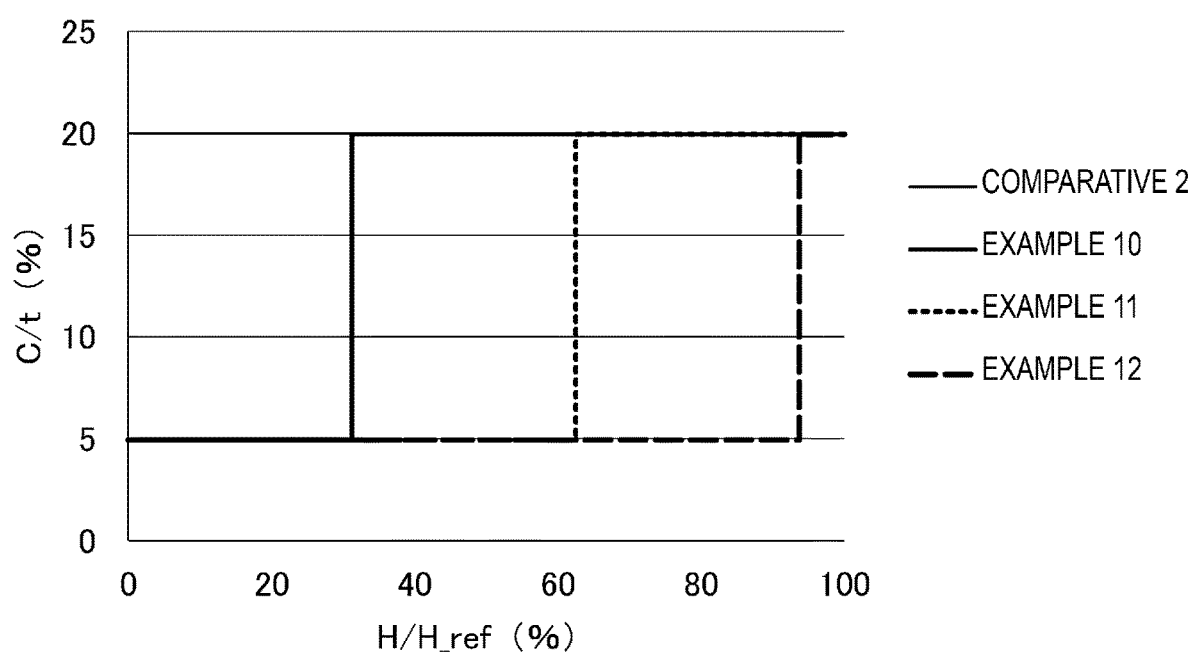
FIG. 15 is a graph for explaining Examples of the invention in which the clearance is collectively increased at a timing determined depending on a movement distance.

FIG. 15 is a graph for explaining Examples of the invention in which the clearance is increased at a single timing determined depending on the relative movement distance. The graph in FIG. 15 shows a relationship between the clearance C (C/t) and the movement distance H ($H/H_{\_ref}$) of the upper blade in Comparative 2 and Examples 10, 11, and 12.

In Comparative 2, the die was fixed so that C/t was increased to the maximum value (20%) at an initial stage.

In Example 10, the dies were exchanged so that C/t was increased to the maximum value (20%) when $H/H_{ref}$=32%.

In Example 11, the dies were exchanged so that C/t was increased from 5% to 20% when $H/H_{ref}$=64%.

Further, in Example 12, the dies were exchanged so that C/t was increased from 5% to 20% when $H/H_{\_ref}$=96%.

Figure 16:
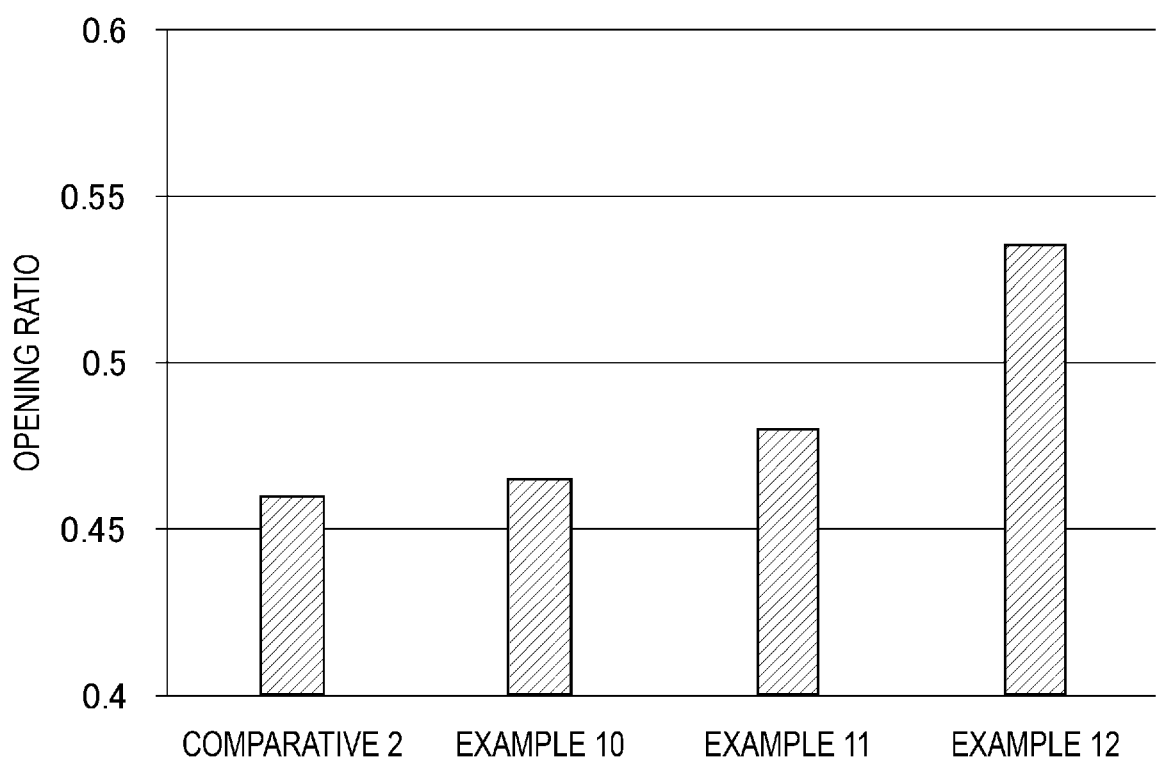
FIG. 16 is a graph showing an opening ratio measured in a side bend test in Examples and Comparative shown in FIG. 13.

FIG. 16 is a graph showing an opening ratio measured in a side bend test in Examples 10 to 12 and Comparative 2 shown in FIG. 15. FIG. 16 shows an opening ratio measured in a side bend test in Examples 10 to 12 and Comparative 2 shown in FIG. 15. As shown in FIG. 16, the opening ratio, which is as low as 46% in Comparative 2, gradually increases as $H/H_{\_ref}$ (marking the die exchange timing) is increased, and significantly improves in Example 12.

It is speculated that the opening ratio is improved in the side bend test shown in Examples 10 to 12 for the following reasons.

Figure 17A:
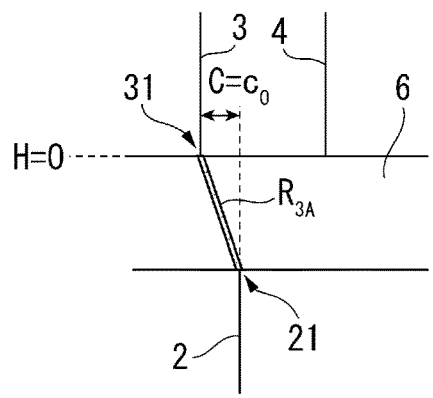
FIG. 17A is a schematic illustration showing an operation of the shearing machine and a behavior of the workpiece when the clearance is collectively increased at the timing determined depending on the movement distance.
Figure 17B:
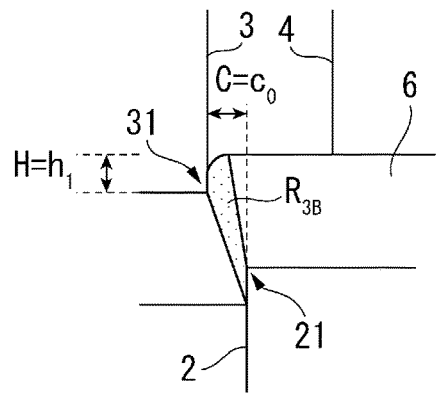
FIG. 17B is another schematic illustration showing the operation of the shearing machine and the behavior of the workpiece when the clearance is collectively increased at the timing determined depending on the movement distance.

Initially, as shown in FIG. 17A, the shearing on the workpiece 6 is started using the upper blade 31 of the punch 3 at the clearance $C=c_0$, where a work-hardened region $R_{3A}$ is developed between the upper blade 31 and the lower blade 21. When the upper blade 31 is lowered in this state, a work-hardened region $R_{3B}$ in the workpiece 6 enlarges as shown in FIG. 17B.

Figure 17C:
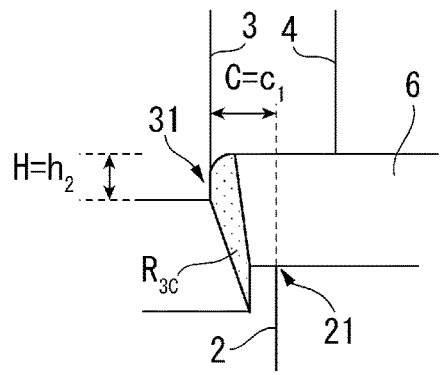
FIG. 17C is still another schematic illustration showing the operation of the shearing machine and the behavior of the workpiece when the clearance is collectively increased at the timing determined depending on the movement distance.
Figure 17D:
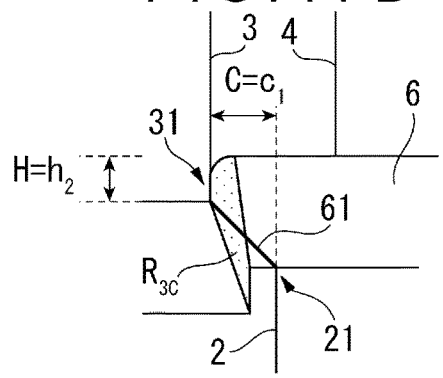
FIG. 17D is a further schematic illustration showing the operation of the shearing machine and the behavior of the workpiece when the clearance is collectively increased at the timing determined depending on the movement distance.

When the upper blade 31 is further lowered, the most work-hardened region $R_{3C}$ appears as shown in FIG. 17C (immediately before the creation of the fractured surface). At this time, when the lower blade 21 of the die 2 is retracted, the fractured surface 61 connecting the upper blade 31 and the lower blade 21 reaches a non-work-hardened region beyond the work-hardened region $R_{3C}$ as shown in FIG. 17D.

Thus, since the work-hardened region is hardly present at the end of the workpiece 6, the worked workpiece 6 has a region without being influenced by the work-hardening on the fractured surface, thereby enlarging the opening ratio.

The above results show that, in order to increase the clearance C depending on the movement distance H to reduce the influence of the work-hardening on an end face of a component after being cut, it is not only effective to increase the clearance C continuously or in a stepwise manner depending on the movement distance H, but also effective to increase the clearance C at a single timing determined depending on the movement distance H. However, since sufficient effect as in Examples 10 and 11 sometimes cannot be obtained depending on the timing for increasing the clearance C, the timing suitable for the movement distance H should be determined in advance through test or the like.

It should be noted that, as can be understood from FIG. 16, the opening ratio is increased as the die exchanging timing $H/H_{\_ref}$ is as close as the timing immediately before the fractured surface 61 is created. Accordingly, it is speculated that the clearance C should most preferably be increased at a timing immediately before the fractured surface 61 is created.

The above-described Examples show that the invention is effective in reducing the influence of the work-hardening at the end face of the workpiece after being cut and in improving processability (e.g. hole expandability) in subsequent steps.

Though the step for increasing the clearance C is started when the movement distance H is 0 (i.e. immediately after the upper blade is brought into contact with the upper side of the workpiece) in the above-described Examples, the step may be started when the movement distance H reaches a predetermined value that is larger than 0 (i.e. when the upper blade is pushed against the workpiece to some degree).

Though the workpiece in a form of a steel sheet with a tensile strength of 615 MPa is sheared in the above Examples, the inventors have found that the invention is more effectively appliable on a steel sheet with a relatively high strength (i.e. having a tensile strength of 270 MPa or more). This is because the behavior of the workpiece described in the above exemplary embodiment of the invention, which is on the premise that ductile fracture cracks occur during the shearing process, is not likely to occur in a steel sheet with low strength because of its excellent local deformability. The inventors have found that the invention is effectively applicable to a high-strength steel sheet with, for instance, a tensile strength of 980 MPa or more, in which the ductile fracture cracks stably occur during the shearing process.

Though the workpiece in a form of a 1-mm thick steel sheet is sheared in the above Examples, the inventors have found that the invention is more effectively applied on a workpiece in a form of a steel sheet with a thickness ranging from 0.2 mm to 2 mm. This is because, when the plate thickness is excessively small, the clearance C becomes small in accordance therewith, so that it becomes difficult to stably control the clearance C by the clearance adjuster. Meanwhile, when the plate thickness is excessively large, the end profile often changes in accordance with the change in the clearance C, so that the effect for reducing the influence of work-hardening at the end surface of the workpiece is not easily obtained. It should be noted that the invention is effectively applicable to a workpiece whose plate thickness ranges from 0.1 mm to 4 mm, or from 0.05 mm to 8 mm depending on the material of the workpiece and the shape of the sheared portion. Further, the workpiece of the invention is not necessarily a steel sheet but may be other metal plate (e.g. aluminum alloy plate).

Preferred exemplary embodiments of the invention have been described in detail with reference to the attached drawings in the above. However, the scope of the invention is not limited to the exemplary embodiments. It would be obvious to those having ordinary skill in the art pertaining the invention that various modifications and variations can be made within the technical idea recited in the claim(s), and such modifications and variations would naturally be within the technical scope of the invention.

The invention claimed is:

1. A shearing method for applying a shear force on a plate-shaped workpiece in a thickness direction of the plate-shaped workpiece to cut the plate-shaped workpiece, the method comprising:

starting application of the shear force on the plate-shaped workpiece by causing a lower blade and an upper blade opposing with a clearance in a surface direction of the plate-shaped workpiece orthogonal to the thickness direction of the plate-shaped workpiece to move relative to each other in the thickness direction of the plate-shaped workpiece;

applying the shear force after the starting application of the shear force until a first fractured surface is created on the plate-shaped workpiece;

increasing the clearance to a maximum value by causing the lower blade to move in the surface direction after the starting application of the shear force until the first fractured surface is created on the plate-shaped workpiece, and determining H_ref, wherein H_ref is a movement distance between the upper blade and the lower blade in the thickness direction of an identical workpiece with the plate-shaped workpiece until a second fractured surface is created on the identical workpiece with the clearance being fixed at the maximum value, wherein the method is performed under a condition:

$$H/H\_ref \leq 80\%,$$

where

H is a movement distance between the upper blade and the lower blade in the thickness direction of the plate-shaped workpiece from the starting application of the shear force to a time when the clearance reaches the maximum value.

2. The shearing method according to claim 1, wherein the shearing is performed under a further condition:

$$5\% \leq C/t \leq 20\%,$$

where

"C" is a distance between the lower blade and the upper blade in the surface direction, and "t" is a thickness of the plate-shaped workpiece.

3. The shearing method according to claim 1, wherein the method is performed using a single shearing machine, the single shearing machine comprising the lower blade configured to be in contact with a lower side of the plate-shaped workpiece and the upper blade movable in the thickness direction of the plate-shaped workpiece relative to the lower blade, and the method further comprises:

bringing the lower blade into contact with the lower side of the plate-shaped workpiece;

moving the upper blade in the thickness direction of the plate-shaped workpiece until the upper blade is in contact with an upper side of the plate-shaped workpiece while retaining the clearance with respect to the lower blade in the surface direction of the plate-shaped workpiece;

moving the upper blade in contact with the upper side of the plate-shaped workpiece further in the thickness direction of the plate-shaped workpiece until the first fractured surface is created on the plate-shaped workpiece; and wherein the increasing of the clearance is dependent on a relative movement distance of the upper blade and the lower blade in the thickness direction of the plate-shaped workpiece after the upper blade is in contact with the upper side of the plate-shaped workpiece until the first fractured surface is created.

4. The shearing method according to claim 3, wherein in the increasing of the clearance, the lower blade and the upper blade are relatively moved away from each other depending on the relative movement distance between the upper blade and the lower blade in the thickness direction of the plate-shaped workpiece.

5. The shearing method according to claim 3, wherein in the increasing of the clearance, the clearance is continuously increased depending on the relative movement distance between the upper blade and the lower blade in the thickness direction of the plate-shaped workpiece.

6. The shearing method according to claim 3, wherein in the increasing of the clearance, the clearance is increased in a stepwise manner depending on the relative movement distance between the upper blade and the lower blade in the thickness direction of the plate-shaped workpiece.

7. The shearing method according to claim 3, wherein in the increasing of the clearance, the clearance is increased at a single timing determined depending on the relative movement distance between the upper blade and the lower blade in the thickness direction of the plate-shaped workpiece.

8. The shearing method according to claim 3, wherein the in increasing of the clearance occurs when the relative movement distance of the upper blade and the lower blade is 20% or more of a reference movement distance, wherein the reference movement distance corresponds to the relative movement distance of the upper blade and the lower blade in the thickness direction of the identical workpiece after the upper blade is in contact with the upper side of the identical workpiece until the second fractured surface is created when the clearance is fixed at the maximum value.

9. The shearing method according to claim 1, wherein the plate-shaped workpiece is a steel sheet having a tensile strength of 270 MPa or more.

10. The shearing method according to claim 1, wherein the plate-shaped workpiece is a steel sheet having a thickness ranging from 0.2 mm to 2 mm.

* * * * *